United States Patent Office 3,458,617
Patented July 29, 1969

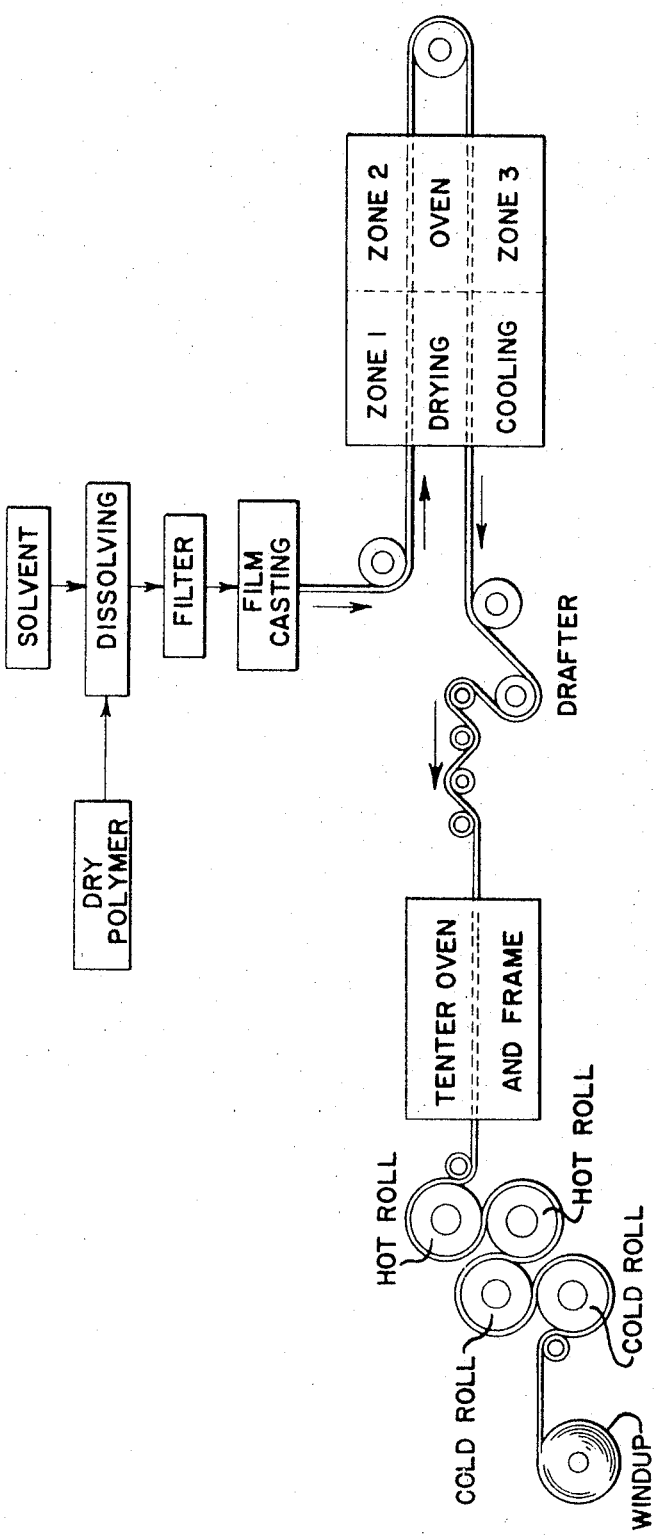

3,458,617
METHOD OF MAKING IMPACT RESISTANT NITRILE POLYMER FILMS
Ralph E. Isley, Northfield, and Kenneth E. Blower, Warrensville Heights, Ohio, assignors to The Standard Oil Company, Cleveland, Ohio, a corporation of Ohio
Filed Feb. 14, 1966, Ser. No. 527,055
Int. Cl. D01f 7/06
U.S. Cl. 264—206                                               3 Claims

ABSTRACT OF THE DISCLOSURE

Oriented nitrile polymer articles, particularly films, of improved impact strength are obtained by heat treating the article to a temperature of at least 240° F. followed by rapid cooling to a temperature of at least 100° F.

---

The present invention relates to the manufacture of nitrile polymer shaped articles of improved impact strength and more particularly pertains to the process for preparing oriented acrylonitrile polymer articles having improved impact strength by heat treatment and quenching of same.

Nitrile polymers useful in the process of this invention include those resinous homopolymers and interpolymers described in U.S. Patent 3,253,058 issued to R. E. Isley and R. C. Adams; copending U.S. patent application of R. E. Isley, R. C. Adams and L. E. Ball, Serial No. 377,041, filed June 22, 1964; and copending U.S. patent application of L. E. Ball, Serial No. 421,612, filed Dec. 28, 1964. The preparation and orientation of films and other shaped articles of the novel nitrile polymers useful in the present process is more fully described in the foregoing copending U.S. patent applications as well as in U.S. Patent 3,380,949 issued to R. E. Isley and K. E. Blower.

The use of heating and quenching techniques in the handling of unoriented thermoplastic materials other than nitrile polymers for purposes other than those of the present invention is well known. The treatment of unoriented cellulose acetate articles so as to reduce their tendency to become scratched is described in U.S. Patent No. 2,328,065. The improvement of the tensile properties of articles fabricated from unoriented polymerized vinylidene chloride is described in U.S. Patent No. 2,205,449. The treatment of unoriented polyethylene terephthalate in this manner is described in U.S. Patent No. 2,728,951 and the treatment of unoriented polyvinyl acetate is described in U.S. Patent No. 3,068,525. The treatment of unoriented polyolefins such as polypropylene and polyethylene is described in U.S. Patents Nos. 2,895,171, 2,990,580, and 3,061,882.

The nitrile polymers useful in the present process include homopolymers and copolymers of a nitrile monomer having the structure

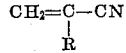

wherein R is a hydrocarbon group, hydrogen or halogen. Representative nitriles of this type of acrylonitrile, methacrylonitrile, alpha-chloro acrylonitrile, etc. The nitrile polymers useful in the present invention include those containing about 70% by weight or more of polymerized nitrile monomer of the foregoing type.

We have discovered that oriented, shaped articles such as pipes, sheets, films, dishes, cups, bottles, monofilaments, and the like which are composed of 70% or more by weight of polymerized nitrile monomer can be made more impact resistant by, first, treatment of the oriented shaped article at an elevated temperature above room temperature while held in its dimensional shape, and, second, rapid cooling of the shaped article to room temperature or below while it is retained in its dimensional shape. The preferred shaped articles for the purposes of this invention are sheets and films and they are preferably also oriented in at least one direction. The most preferred shaped articles in the process of this invention are biaxially oriented sheets and films.

The most preferred nitrile polymer for the present process is a polymer of at least one nitrile monomer having the structure

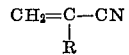

wherein R is hydrogen or a methyl group, including the homopolymers which may contain up to about 30% by weight of the polymer of one or more polymerizable monoalkenyl or polyalkenyl monomers copolymerizable with acrylonitrile. Stated differently, the most preferred nitrile polymers for the purposes of this invention are those prepared from a monomer mixture of from 70 to 100% by weight of acrylonitrile.

Useful monoalkenyl monomers for the purposes of this invention include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate and the like; the vinyl aromatics such as styrene, alpha-methyl styrene, vinyl toluene, the vinyl xylenes, the vinyl naphthalenes, isopropenyl benzene and the like; vinyl amides such as acrylamide, methacrylamide, N-methyl acrylamide, vinyl benzamide, N-vinyl pyrrolidone and the like; the vinyl halides, such as vinyl chloride, vinyl bromide, vinyl fluoride, vinylidene chloride, vinylidene fluoride, dichloro difluoro ethylene, tetrafluoroethylene and the like; olefins such as ethylene, propylene, isobutylene, butene-1 and the like.

Useful polyalkenyl monomers include those having at least two vinyl groups per molecule such as allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1-trimethoxypropanedimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraalyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyallyl ether of polyhydric alcohols such as tetrallyl pentaerythritol, hexaallyl sucrose, hexaallyl inositol, hexaallyl sorbitol, hexavinyl sucrose and the like and others.

The nitrile polymers useful in this invention may be prepared in any convenient manner such as by batch, bulk, solution, emulsion or suspension polymerization techniques, all of which are well known to those skilled in the art.

The films useful in this invention can be prepared by any of the known film-forming techniques such as solvent casting, extrusion, calendering, etc. The films can be oriented by known procedures and particularly by procedures described in the aforementioned copending U.S. patent applications. Nitrile polymer solutions suitable for casting of films may be prepared by dissolving from about 10 to 30% by weight of the polymer in one or a combination of volatile polar solvents, such as dimethyl formamide, dimethyl thioformamide, N - methylbeta - cyano - ethyl formamide, alpha-cyano acetamide, N-methyl pyrrolidone, gamma-butyrolactone, ethylene carbonate, tetramethyl oxamide, epsilon-cyanolactam, 1,3,3,5-tetracyanopentane, dimethyl cyanamide, dimethyl methoxy acetamide, N-formyl morpholine, N-formyl hexamethylene imine, dimethyl sulfoxide, propiolactone, N,N-dimethyl acetamide, dimethyl sulfone, tetramethylene cyclic sulfone, ethylene cyanhydrin, nitromethane, acetonitrile, malononitrile, tris-dimethylamino-phosphine oxide, N,N'-tetramethylmethanephosphonamide, etc., to form a high solids, pourable solution.

Films can be formed from solutions or dry blends, with solvents of the polymers embodied herein by extrusion, milling, sheet-casting or other known techniques which involve depositing a uniform film of the polymer-solvent mixture on a smooth, flat surface and removing the solvent from the film by volatilization.

The nitrile polymer film can be oriented by stretching at a selected temperature, usually in a gaseous atmosphere such as air or nitrogen. The nitrile polymer film can also be oriented in two mutually perpendicular directions simultaneously or sequentially to form an oriented film which still may contain volatile material. Heat setting of the film accompanied by removal of the volatile material is then carried out while holding the film under tension to restrict dimensional change in the plane of the film and thereafter cooling the film and releasing the tension thereon.

In one procedure, using polyacrylonitrile as an example, the cast film, still containing from 8 to 60% by weight of solvent, and preferably from 25 to 45% by weight of solvent, is passed continuously to a drafter or similar device for longitudinal streaching. In the drafting operation it is desirable to employ temperatures of from about 100 to 260° F. and preferably from about 145 to 180° F. on the hot rolls and the cold rolls preferably are maintained at or near room temperature. The stretch ratio employed in the drafting operation can be from 1.2:1 to 10:1 stretched length-to-original length and preferably from about 2:1 to 4:1. The film, still containing most of the solvent it contained on entering the drafter, next is fed continuously into a tenter or similar apparatus where transverse stretching is carried out. On the order of about half of the solvent originally present in the film as it entered the drafter is removed during the tentering operation. The tentering operation is usually carried out at temperatures in the range of from about 100° F. to about 260° F. and preferably from about 145 to 180° F. The ratio of stretching in the tentering operation is about the same as that described in the drafting operation or just a little less. The film is next heat set which comprises holding it so that it cannot retract either laterally or longitudinally and heating it at from about 125 to 250° C. for from a fraction of a second up to about five minutes. Finally the film is cooled to about room temperature and rolled up or cut up in various lengths, etc. Substantially all of the residual solvent is removed from the film during the heat setting operation so that the final cooled film will not contain any more than 10% and preferably no more than 5% by weight of residual solvent and more preferably the final film shall be substantially free of residual solvent.

The unexpected impact improvement of the present invention is accomplished by heating the nitrile polymer film or other shaped article to a temperature at least about 240° F. and below about 500° F. while retaining it in a dimensionally stable condition for a period of from less than 1 second up to about 5 minutes and preferably from less than one second up to about sixty seconds and then rapidly cooling to a temperature of at least about 100° F.

Referring now to the accompanying drawing which is a flow-sheet setting forth in diagrammatic form one of several possible specific modes of operation: A solution of the polymer, formed by dissolving the dry polymer in an appropriate solvent, is pased through a filter and is then distributed in uniform thickness onto a moving stainless steel belt which passes through a drying oven which in this particular case was three heating zones and a cooling zone. The self-supporting partially dried film is then removed from the stainless steel belt and is passed continuously to a differential roll speed drafter, where it is stretched in a longitudinal direction by passing between a pair of heated, slow moving rollers and then between a pair of unheated fast moving rollers. The film is then passed continuously into a tenter frame housed in a heated enclosed tenter oven where it is streached substantially at right angles to its length. While still on the tenter frame and near the exit from the oven the film is heat set and cooled. The dry film is passed continuously between a pair of rapidly moving heated rollers and then between a pair of rollers, moving at the same rate of speed and cooled by means of a circulating coolant. The finished film is then rolled onto a film winder.

The films and other shaped articles embodied in the present invention are outstanding barriers for various gases, water vapor and the like and in this respect they resemble metals more than they resemble other plastics which are commercially available. The films and other articles of this invention also have excellent resistance to attack by most chemicals, they have excellent dimensional stability, excellent resistance to degradation by ultraviolet radiation, they have good electrical properties and excellent mechanical strength including high tensile strength, high tensile modulus and excellent abrasion resistance. The foregoing and other desirable properties make the films of this invention particularly useful in a wide variety of applications such as magnetic tape, surfacing and laminating, packaging, electrical insulating tape, pressure sensitive tapes, glazing and the like. The films of this invention can be laminated to plywood, wood, fiberglass panels, aluminum or other metals, paperboard or similar materials. Many of such laminated structures, as well as the film itself, are satisfactory for both indoor and outdoor use. The films and laminates may be metallized and end uses of a specific nature for laminates include chairs, bench tops, doors, radiant heating panels, thermal insulation, house siding and roofing, curtain wall panels, signs, vending machines, baseboard trim, cabinets, appliances, flooring, awnings, baby carriages, tarpaulins, reflector signs, vehicle trim, dry battery covers, wall paper and fuel cells. Metallized film can be cut into fine strips and made into metallized yarn of varying colors.

It is to be understood that those skilled in the art can make various modifications and changes in the compositions and processes described herein without departing from the scope of this invention.

In the following illustrative examples the amounts of ingredients are expressed in parts by weight unless otherwise indicated.

EXAMPLE I

An acrylonitrile copolymer was prepared from the following recipe:

|  | Parts |
|---|---|
| (a) Water | 400 |
| (b) Emulsifier (GAFAC RE-610)[1] | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinyl ether | 0.34 |
| (h) Acrylonitrile | 97.9 |

[1] A mixture of $R-O-(CH_2CH_2O-)_nPO_3M_2$ and $[R-O-(CH_2CH_2O-)_n]_2PO_2M$ wherein $n$ is a number of from 1 to 40, R is an alkyl or alkaryl group and preferably a nonyl phenyl group and M is hydrogen, ammonia or an alkali metal, which composition is sold by the General Aniline and Film Corp.

Ingredients (a)-(e) were charged into a reactor and the temperature was brought to 50° C. with stirring. A nitrogen atmosphere was maintained in the reaction vessel. Ingredients (f) and (g) were added and polymerization of these two monomers was substantially completed in about a 90 minute period. Then the ingredient (h) was added continuously over a 195 minute period while the reaction mixture was maintained at 50° C. and the resulting polymer dispersion was stirred and heated at 50° C. for an additional three hours. The final product was a suspension of polymer in water from which the polymer was readily isolated by filtration. The isolated polymer was washed on the filter and dried in an oven.

The dry polymer prepared as described above was dissolved to form a 17% solution by employing a high speed stirrer and a temperature of 60° C. The solvent employed was a 90/10 mixture of dimethyl formamide and ethylene carbonate. A ten gallon jacketed and stirred pressure autoclave was employed. The solvent was added followed by the polymer with stirring. Agitation was vigorous enough to maintain a uniform suspension in the early stages of dissolving. The suspension was then heated at 55–65° C. and the polymer dissolved readily. This is a low viscosity type of solution preparation as opposed to polymer mastication and dilution in a kneading type of mixer. The resulting polymer solution was filtered by passing it through a screen pack filter built up from stainless steel screens. A 140 mesh stainless steel screen was used which was protected on either side by a 40 mesh screen.

The above solution or dope was cast using a doctor blade in the laboratory or a three roll reverse roll coater on a larger scale. A heated dope and a heated reverse roll coater were used at temperatures of about 160° C. The dope was cast onto a stainless steel endless belt and was dried in a three zone circulating air oven. The resulting film when removed from the belt contained 14.7% by weight of dimethyl formamide and 20.5% by weight of ethylene carbonate.

The film produced in the foregoing manner was then run through a drafter having two heated rolls and two cold rolls for longitudinal orientation. The heated rolls were maintained at about 160° F. and the cold rolls were maintained at about 60° F. The stretch ratio in the drafter was about 3:1 or 200% elongation of the film which was achieved by running the cold rolls faster than the hot ones. A typical calculated elongation rate on the drafter was about 90,000% per minute. The stretched film was found to contain 10.7% by weight of dimethyl formamide and 20.1% by weight of ethylene carbonate or 30.8% by weight of total solvent.

After longitudinal orientation the film was stretched laterally in a tenter frame. The stretch ratio in the lateral direction was 2.8:1 (180%). The oven stretch zone temperature of 160° F. was maintained. Maximum calculated rate of stretch in the lateral direction was about 1730% per minute. The solvent content of the film after stretching was 0.0% by weigh dimethyl formamide and 16.3% by weight ethylene carbonate.

The biaxially oriented film from above was then run through a heat set zone in a tenter frame oven. The oven zone temperature was 400° F. and a time of 30 seconds at this temperature was employed. The final solvent analysis of the film indicated no dimethyl formamide and less than 1% by weight of ethylene carbonate present.

The film prepared in the foregoing manner was found to have the following properties:

| | |
|---|---|
| Longitudinal tensile strength, p.s.i. | 20,900 |
| Elongation, percent | 65 |
| Lateral tensile strength, p.s.i. | 20,000 |
| Elongation, percent | 85 |
| (ASTM D282) | |
| Tensile heat distortion (ASTM D1637-61), ° C. | 255 |
| Hydrogen transmission rate, cm.$^3$/100 in.$^2$/24 hr./atm., sample ½-mil thick (ASTM D1434-58) | 34.5 |
| Water vapor transmission rate, g./100 in.$^2$/24 hr./mil (ASTM E96, Procedure A, 73.4° F. and 50% relative humidity) | 011 |
| Gas transmission (cc./100 in.$^2$/24 hr./atm./mil): | |
| Oxygen | 0.0016 |
| Carbon dioxide | 0.001 |
| Nitrogen | 0.001 |
| Methane | 0.0041 |
| Helium | 62.5 |
| Ammonia | 0.054 |
| Density, g./cc. | 1.172 |

EXAMPLE II

Acrylonitrile was homopolymerized in aqueous emulsion with a redox initiator and a mercaptan modifier for molecular weight control. The following ingredients were placed in a three liter, three neck, round bottom flask equipped with stirrer, thermometer, nitrogen inlet and reflux condenser:

| Parts | Grams | Material |
|---|---|---|
| 400 | 1,500 | Water (deoxygenated and purged with nitrogen). |
| 100 | 375 | Acrylonitrile (free of inhibitor). |
| 3.5 | 13.1 | Emulsifier. |
| 0.35 | 1.17 | Modifier (t-dodecyl mercaptan). |
| 0.50 | 1.88 | $(NH_4)_2S_2O_8$. |
| 0.23 | 0.86 | $Na_2S_2O_5$. |

The polymerization reaction was carried out at 50° C. for a period of 5½ hours with continuous stirring and in a nitrogen atmosphere. Polyacrylonitrile was recovered by coagulation with aluminum sulfate solution and washing with water to remove residual emulsifier. A yield of 341 grams (91% of theory) of polyacrylonitrile was obtained.

50 grams of the powdery polyacrylonitrile product from above was dissolved in 300 grams of a 90:10 by weight mixture of dimethyl formamide and ethylene carbonate, respectively, to give a viscous dope containing 14.3% by weight of polymer. This dope was passed through a coarse glass frit filter and the filtrate was used to cast a film onto a flat glass plate by means of a 50 mil doctor blade. The cast dope was then dried partially to a solvent containing film in about 1 hour at 62° C.

The foregoing film containing about 31 to 50% solvent was then oriented biaxially on a film orientor which was a machine operated pantograph equipped with clips to prevent the film from "necking in" during extension of the pantograph. The heat supplied during the orientation was supplied by a 1500 watt radiant heater mounted about three inches above the pantograph (60–95° C.). The speed of orientation was governed by a speed changer on a ½-horsepower electric motor connected through a gear system to the pantograph frame. The speed setting on the orientor speed changer was 1500 (180 in./min.), the voltage applied to the radiant heater was 150 volts and time in seconds of heating prior to start of orientation or stretching was varied. The films were oriented biaxially in separate steps by orientation first in the "primary" direction and then by turning the film and orienting it under substantially the same conditions in the "secondary" direction which was the direction substantially 90° to the primary direction. After the second orientation the film was dried for a time while under tension under the radiant heater. The results are given in the following table:

HEATING TIME (60–95° C.) PRIOR TO ORIENTATION SECONDS

| Film sample | Primary direction | Secondary direction | Final drying time, min |
|---|---|---|---|
| A | 25 | 12 | 10 |
| B | 25 | 12 | 15 |

Residual solvent in the films of 11.4 to 24.6% was found after orientation and drying.

A "heat set" step was next employed on the films described above. The films were retained in a metal frame to prevent relaxation in either of the oriented directions and the retained film was dried in a forced air oven at 200° C. for one minute. The tensile properties (ASTM D882–61T) for the heat set films described above which contained 4.4 to 9.3% residual solvent are given below:

TENSILE STRENGTH
[10$^{-3}$ p.s.i.]

| Film sample | Primary direction | Secondary direction | Percent elongation | |
|---|---|---|---|---|
| | | | Primary | Secondary |
| A | 14.06 | 16.34 | 108 | 56.5 |
| B | 15.52 | 14.6 | 75.4 | 81.7 |

Similar results were obtained when the initial film was deposited by extruding the solution from a film die onto a smooth surface.

Results similar to the foregoing were obtained when methacrylonitrile and acrylonitrile-methacrylonitrile copolymers were employed in place of the polyacrylonitrile described.

EXAMPLE III

A copolymer of acrylonitrile and divinyl benzene was prepared in a single step (batch) polymerization using the following ingredients in the batch charge:

| | Parts |
|---|---|
| Distilled water | 400 |
| Acrylonitrile | 100 |
| Divinyl benzene | 0.38 |
| t-Dodecyl mercaptan | 0.6 |
| GAFAC RE-610 emulsifier | 3.5 |
| Ammonium persulfate | 0.5 |
| Sodium metal-bisulfite | 0.23 |

The first five ingredients were charged to the reactor which was then purged with nitrogen and brought to 50° C. under agitation. The polymerization was accomplished by addition of the last two ingredients (initiator-ammonium persulfate and sodium meta-bisulfite). The polymerization reaction was conducted for about six hours. The resulting polymer was isolated by filtration and was washed thoroughly to remove emulsifier and initiator and was then air dried at 70° C. for 36 hours. The yield of polymer was 96% of theory.

A 14% solids solution of the foregoing polymer was prepared in a 9:5 mixture of dimethyl formamide: ethylene carbonate and a film was cast on glass plates from the solution by means of a 5 mil casting blade. The films were then "set" for an hour in an air oven at 65° C.

The solvent-swollen films from above were removed from the glass and were oriented biaxially in a two-step laboratory orientation apparatus. Orientation in the primary direction was accomplished by heating the film for 30 seconds with a 1500 watt radiant heater and then quickly drawing the film to three times its original length. Subsequent secondary drawing in a direction at right angles to the primary direction was accomplished in the same manner.

The biaxially oriented film was then heat set in a retaining frame which retained the dimensions of the film at a temperature of from 195–200° C. for from 1 to 2 minutes. Films thus prepared having the various longitudinal and transverse draw ratios were found to have the physical properties given in the table below:

| Draw ratio | | Tensile strength × 10$^{-3}$ p.s.i. | | Percent elongation | |
|---|---|---|---|---|---|
| Long. | Lat. | Long. | Lat. | Long. | Lat. |
| 3 | 3 | 22.6 | 18.4 | 71 | 83 |
| 2.6 | 2.5 | 13.8 | 14.2 | 66.5 | 66.1 |
| 3 | 2.5 | 13 | 15.3 | 16.2 | 42.7 |
| 3.2 | 2 | 16 | 13.5 | 42.7 | 57.6 |

EXAMPLE IV

A copolymer of the type described in Example III was prepared and biaxially oriented to form a final film of 0.4 mil thickness. A draw ratio of 2.3 longitudinal, 2.7 lateral was employed in preparing the oriented film. This film was found to have a tensile impact strength of 750 foot pounds per square inch.

Samples of the foregoing biaxially oriented film were placed in a metal frame which held the film in a dimensionally stable condition and the frame with film was placed in a forced air oven in a horizontal position for one minute. At the end of the minute the film was quenched by pouring ice water over the film and immediately removing the frame and film from the oven. The effect of oven temperature on the tensile impact strength of the biaxially oriented film was studied in this way and the following results were obtained:

| Oven temperature, ° F.: | Tensile impact, foot pound/in.$^2$ |
|---|---|
| 212 | 750 |
| 230 | 780 |
| 239 | 850 |
| 257 | 975 |
| 275 | 1100 |
| 284 | 1225 |

EXAMPLE V

The procedure of Example IV was repeated with the exception that the oven temperature was held constant at 275° F. and the time the film was heated in the oven was varied with the following results:

| Time in oven, minutes | Tensile impact, foot pound/in.$^2$ |
|---|---|
| 0.5 | 1400 |
| 1.0 | 1100 |
| 1.5 | 975 |
| 2.0 | 925 |

EXAMPLE VI

A 0.4 mil film of a biaxially oriented (stretch ratio was 2.3 long, 2.7 lat.) acrylonitrile copolymer film prepared according to Example I was heated and quenched on a film drafter. The tensile impact of this film was 1250 foot pound/in.$^2$. The drafter contained two hot rolls and two cold rolls. The film was passed over the hot rolls, across a ½" gap and onto the cold rolls (25–30° F.) continuously and the heating period was controlled by the speed of the rolls. Several variations in time and temperature were studied with the following results:

| Hot roll temp. °F. | Time, secs. | Tensile impact, foot pound/in.² |
|---|---|---|
| 240 | 5 | 1,560 |
| 240 | 10 | 1,260 |
| 240 | 20 | 1,080 |
| 260 | 5 | 1,770 |
| 260 | 10 | 1,584 |
| 260 | 20 | 1,700 |
| 280 | 5 | 1,608 |
| 280 | 10 | 1,668 |
| 280 | 20 | 1,716 |
| 300 | 5 | 1,580 |
| 300 | 10 | 1,660 |
| 300 | 20 | 1,488 |
| 320 | 5 | 1,680 |
| 320 | 10 | 1,820 |
| 320 | 20 | 1,820 |

EXAMPLE VII

The procedure of Example VI was repeated using an acrylonitrile copolymer film which had a tensile impact of 920 foot pounds/in.² in the unquenched, initial condition after biaxial orientation and heat setting. The following results were obtained:

| Hot roll temp. °F. | Time, secs. | Tensile impact, foot pound/in.² |
|---|---|---|
| 250 | 10 | 1,160 |
| 250 | 20 | 990 |
| 275 | 10 | 1,100 |
| 275 | 20 | 1,130 |
| 300 | 10 | 1,080 |
| 300 | 20 | 1,200 |
| 330 | 10 | 1,075 |
| 330 | 20 | 1,200 |
| 360 | 10 | 1,030 |
| 360 | 20 | 1,125 |
| 390 | 10 | 1,000 |
| 390 | 20 | 1,280 |

EXAMPLE VIII

Results which were comparable with those given in Examples IV–VII were obtained when the polymer of Example II was employed.

EXAMPLE IX

Results which were comparable with those given in Examples IV–VIII were obtained when a film based on a copolymer of 70% acrylonitrile and 30% ethyl acetate was used.

We claim:
1. The process for preparing an impact resistant biaxially oriented nitrile polymer film comprising
   (1) forming a solution of a polymer selected from the group consisting of homopolymers and copolymers of a nitrile monomer having the structure

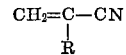

wherein R is hydrogen or methyl, said copolymer containing up to 30% by weight of a monoalkenyl or polyalkenyl monomer copolymerizable with the nitrile monomer, in a volatile polar organic solvent,
   (2) forming a film containing from 8 to 60% by weight of solvent from the solution of (1),
   (3) stretching the film from (2) at a temperature of from 100 to 260° F. in a longitudinal and a transverse direction so that the film contains at least about one-half the weight of polar solvent that it contained after (2),
   (4) drying and heat setting the film at a temperature of from about 257 to 482° F. for up to about five minutes while it is retained in its biaxially stretched condition,
   (5) quenching the film while still under tension to a temperature of at least about 100° F.
2. The process of claim 1 wherein the monomer is acrylonitrile.
3. The process of claim 2 wherein the time in step 4 is from less than one second up to about sixty seconds.

References Cited

UNITED STATES PATENTS

| 3,056,170 | 10/1962 | Hendricks et al. | 264—210 |
| 3,068,525 | 12/1962 | Linton et al. | 264—290 |
| 3,380,949 | 4/1968 | Isley et al. | 260—30.4 |

FOREIGN PATENTS 887,008  1/1962  Great Britain.

JULIUS FROME, Primary Examiner

A. H. KOECKERT, Assistant Examiner

U.S. Cl. X.R.

264—210, 235, 237, 289, 344, 345, 348